US008862457B2

(12) United States Patent
Martino et al.

(10) Patent No.: US 8,862,457 B2
(45) Date of Patent: Oct. 14, 2014

(54) METHOD AND SYSTEM FOR SMART MARK-UP OF NATURAL LANGUAGE BUSINESS RULES

(75) Inventors: Jacquelyn A. Martino, Yorktown Heights, NY (US); Paul M. Matchen, Yorktown Heights, NY (US); Rosario A. Uceda-Sosa, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1365 days.

(21) Appl. No.: 12/497,370

(22) Filed: Jul. 2, 2009

(65) Prior Publication Data

US 2011/0004464 A1    Jan. 6, 2011

(51) Int. Cl.
*G06F 17/27* (2006.01)

(52) U.S. Cl.
CPC .................................. *G06F 17/2765* (2013.01)
USPC ............................................................ 704/9

(58) Field of Classification Search
None
See application file for complete search history.

(56) References Cited

U.S. PATENT DOCUMENTS

| 5,175,814 | A |   | 12/1992 | Anick et al. |
| 5,471,613 | A | * | 11/1995 | Banning et al. ........... 1/1 |
| 5,701,456 | A |   | 12/1997 | Jacopi et al. |
| 5,721,900 | A |   | 2/1998 | Banning et al. |
| 5,790,778 | A |   | 8/1998 | Bush et al. |
| 5,933,145 | A |   | 8/1999 | Meek |
| 6,026,388 | A |   | 2/2000 | Liddy et al. |
| 6,434,523 | B1 | * | 8/2002 | Monaco ..................... 704/257 |
| 6,684,183 | B1 | * | 1/2004 | Korall et al. ................. 704/9 |
| 6,925,608 | B1 |   | 8/2005 | Neale et al. |
| 8,396,712 | B2 | * | 3/2013 | Khosla ....................... 704/257 |
| 2002/0188599 | A1 | * | 12/2002 | McGreevy ................... 707/3 |
| 2003/0200208 | A1 |   | 10/2003 | Sajwan et al. |
| 2004/0039730 | A1 |   | 2/2004 | Saeki |
| 2004/0172520 | A1 |   | 9/2004 | Smit et al. |
| 2005/0222980 | A1 |   | 10/2005 | Lee |
| 2005/0262056 | A1 |   | 11/2005 | Hamzy et al. |
| 2006/0195427 | A1 |   | 8/2006 | Kilroy |
| 2006/0294130 | A1 |   | 12/2006 | Soo et al. |
| 2008/0109475 | A1 |   | 5/2008 | Burmester et al. |

FOREIGN PATENT DOCUMENTS

TW    I267756 B    12/2006

OTHER PUBLICATIONS

Hildreth, Sue, Rounding Up Business Rules, Computerworld, May 23, 2005, www.computerworld.com/printthis/2005/0,4814,101844,00.html.
Office Action dated Oct. 27, 2011 received in a related U.S. Patent Application, namely U.S. Appl. No. 12/497,319.
Office Action dated Apr. 19, 2012 received in another related U.S. Patent Application, namely U.S. Appl. No. 12/497,378.

* cited by examiner

*Primary Examiner* — Angela A Armstrong
(74) *Attorney, Agent, or Firm* — Scully, Scott, Murphy & Presser, P.C.; Daniel P. Morris, Esq.

(57) ABSTRACT

Smart Mark-up or highlighting delimits a rule using ontology technology to identify words and fields as objects and/or possible values in the rule. These technologies support the user in formalizing parts of the rules in a manner consistent with the system's data.

25 Claims, 15 Drawing Sheets

METHOD AND SYSTEM FOR SMART MARK-UP OF NATURAL LANGUAGE BUSINESS RULES

CROSS-REFERENCE TO RELATED APPLICATIONS

This application is related to co-owned U.S. patent application Ser. No. 12/497,319, published as U.S. Patent Application Publication No. 2011-0004632, published on Jan. 6, 2011 entitled "MODULAR AUTHORING AND VISUALIZATION OF RULES USING TREES" and U.S. Pat. No. 8,381,178, issued February 19, 2013 entitled "INTUITIVE VISUALIZATION OF BOOLEAN EXPRESSIONS USING FLOWS". Those applications are incorporated herein by reference in their entirety.

BACKGROUND

The present application generally relates to information management systems, and more specifically to smart mark-up of natural language business rules.

Decisions made by business enterprises can be represented by one or more business rules. As used herein the term "rule" refers to one or more actions or operations that are performed upon the satisfaction of one or more conditions. A "business rule" refers to one or more business actions or business operations that are performed upon the satisfaction of one or more conditions. For example, in the context of a financial company that issues credit cards, the process for determining whether to offer a credit card to a particular individual based upon particular financial or demographic information can be represented by one or more business rules.

Formulating business decisions into business rules allow those business decisions to be automated using computer software. That is, the business logic and conditions defined by business rules can be embodied in computer software. Referring to the prior example, it is not uncommon for financial companies to automate, using computer software, the decision about whether a credit card should be offered to a particular individual. Conventionally, these types of computer systems use complex customized software to implement business rules.

A significant problem with using custom software to implement business rules is that the people in business organizations who decide on changes to business rules generally cannot themselves implement those changes in the computer software. When business logic or conditions change, the computer software must be updated to reflect the change. For example, in the context of issuing credit cards, if the minimum salary requirement is changed from X to Y, then the software must be manually updated to reflect the change in the minimum salary requirement from X to Y. Updating computer software generally requires technical expertise that the business people who decide the business rules may not have. These people are often financial analysts or high-level managers. Updating the software typically involves changing values in source code or data files and then "rebuilding" the software, which requires recompiling source code to generate object code and then linking the object code with libraries of other object code to generate a new runtime executable.

Rule engines have become critical in today's businesses. Some of the major reasons for this need are identified as: 1. the businesses' need to react quickly to a rapidly changing environment; 2. the growing prevalence of less technical users who are becoming responsible for building, editing and validating rules of the business (the business user); 3. an increased demand for businesses to create audit trails; 4. a "patch" for legacy systems; and 5. interest in business process management and integration with service oriented architectures.

Existing systems remain focused on the highly technical user and as such are not easy to use for business users. The existing solutions also force a top-down methodology whereby the user must understand the entire intent of a rule before being able to manipulate it. These solutions employ methods such as tables or spreadsheet type inputs and/or large decision trees. While such methods may be very effective for solving simple systems of rules, they become untenable for medium and large systems of rules. A trend in the known solutions is to use iconic representation, visual systems and natural language to represent rules in the system. Such methods promise increased ability to handle medium and larger systems of rules, yet they do so with the user as the primary composer of the formalized rule.

BRIEF SUMMARY

A system and method for transforming a natural language expression into a formal logical expression are provided. The method in one aspect may comprise identifying using a database of ontology, words in a natural language expression as resources, constants and comparisons, the resources being associated with meta data that specify when to use the words of the resources; and using the identified words representing resources, constants and comparisons to build a formal logical expression.

A system for transforming a natural language expression into a formal logical expression, in one aspect, may comprise a user interface module operable to present at least a rule pad section and a rule editor section, the rule pad section for entering a rule in natural language expression, and the rule editor section for presenting formalized rules. A database of ontology stores word concepts and relations. A processing module is operable to identify words of a natural expression in the rule as resources, constants and comparisons using the ontology, the resources being associated with meta data that specify when to use the words of the resources, and build a formal logical expression, said formal logical expression being presented via the rule editor section.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

A system, a method and a tool that enable users to compose rules or rule parts using smart markup technology are provided. The tool may be embodied as computer system or computer software. Smart markup, also referred to as highlighting, delimits a rule by using ontology technology to identify main words and fields as objects and/or possible values in the rule. In this way, the system and method support a bottom-up working methodology that is analogous to the ways in which users actually work and think about the requisite logic structures when authoring, editing, validating and managing business rules.

Figure 1:
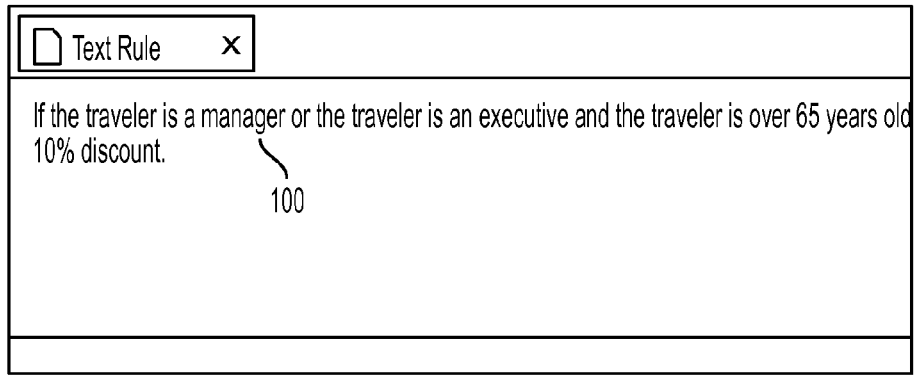
FIG. 1 illustrates a rule pad or smart mark-up area according to one embodiment of the present disclosure.

The system and method of the present disclosure utilize mark-up technologies. In one aspect, the user need not begin the task of building or changing a rule from scratch. Rather, the user is supported by an ontology technology that helps in mapping the vocabulary of the rule to the data already in the system. The vocabulary of the rule refers to the words familiar to the rule author within the domain in which that author is working. For example, within the domain of employee travel, the author may refer to "traveler", "destination", "city", "airline." The vocabulary of the rule may include all of the words of the rule that are not specifically Boolean operators. FIG. 1 illustrates a screen shot of a user interface program that shows a rule pad or smart mark-up area according to one aspect of the present disclosure. The rule pad area may be presented on a computer screen, e.g., within a webpage or other user interface, and may be invoked in similar ways that a user would invoke a text editor or word processor, e.g., by selecting an icon on a desktop, or otherwise running a computer program or like. The user interface program may incorporate any known or will be known methodology to provide an area where a user may enter and edit data. As shown in FIG. 1, the rule pad or smart markup area is where text based rules 100 are entered. The rule author or like user may enter the text rule, e.g., based on the knowledge of the rule author or using a shared repository of rule fragments, etc. The rules 100 may be entered by methods such as manually typing or entering the rules, copying and/or pasting from existing rule policies (e.g., travel policies, insurance policies, etc. of an entity or business), direct (database) access from existing rule policies (e.g., travel policies, insurance policies, etc.), or any by any other methods.

Figure 2:
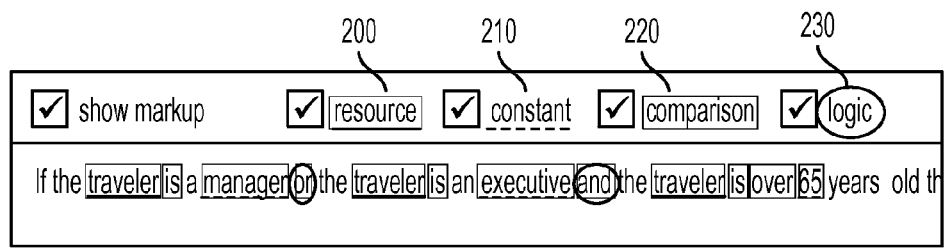
FIG. 2 illustrates a rule pad or smart mark-up area according to one embodiment of the present disclosure.

FIG. 2 illustrates a rule pad or smart mark-up area according to one aspect of the present disclosure. Ontology technology is used to automatically identify words and/or expressions in the entered rule as concepts and properties of the underlying system data. For example, once the rule is entered, the expressions and words in the rule are automatically mapped to the underlying data and data structure. The ontology may include all of the expected words within a domain space for automatic mapping. When the author uses words that are not found in the ontology, i.e., unexpected within a domain space, the words are not marked-up. At this point, the user has the opportunity to define the unexpected words and/or map them to already defined words and add them to the ontology. As an example, the word "customer" may be an unexpected word that the user could map to the word "traveler." For instance, the system and method of the present disclosure intelligently mark up words of a proposed rule by selecting groups of text in the entered rule based on the knowledge of system resources. System resources are meta data whose goal is to understand when it is appropriate to use any of these words and is consistent with the underlying data against which the rule will be run. An example of metadata is a statement such as: "executive is an employee." An example of underlying data is a database of employee records including employee status, employee rank, etc.

In the example of FIG. 2, systems resources 200 include "traveler", constants 210 include "manager", "executive", "65", comparison operators 220 include "is", "is over" and logic operators 230 include "or", "and". That is, texts in the entered rule are automatically identified or categorized as a system resource, constant, comparison operators and/or logic operators.

An example of a resource 200 is "traveler" The system and method of the present disclosure recognizes this word "traveler" as a resource, for example, from the mapping described above, i.e., that word is part of the ontology of the domain which maps to an underlying data structure. An example of a comparison operator 220 is "is over". Groups of text may be contiguous or disjoint, and various visualization may be provided to represent different parts of the rule, for example, different colors may represent different parts of the rule, e.g., resources, constants, comparisons and logic operators.

Figure 3:
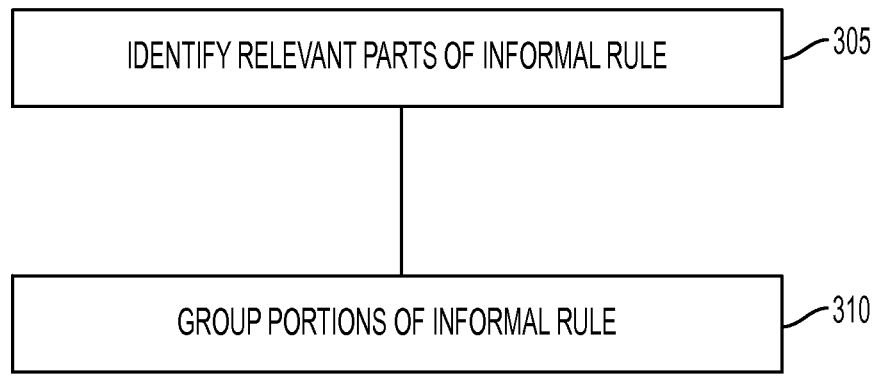
FIG. 3 illustrates a flowchart indicating how the user would be supported in a bottom up working method according to one embodiment of the present disclosure.

FIG. 3 is a flow diagram illustrating how the user may be supported in a bottom up working method according to one aspect of the present disclosure. In order to define new resources or search for existing resources, the user may combine elements from the rule pad whether they are contiguous or disjoint, i.e., next to one another or separated by one or more words. It is possible that words in the rule that represents a resource may not appear contiguously in the sentence (rule) since the natural language order and syntax of Boolean expressions may be different. The user may combine the selected elements using methods known in the art such as multiple selection, drag-selecting, or other known or will be known methods, etc. Step 305 and step 310 may occur in any order. At step 305, the parts of the informal rule, i.e., resources, constants, comparison and logic words as shown in FIG. 1, are identified automatically by the system and method of the present disclosure. Those parts are relevant to the understand of the rule within the domain of the ontology in use. For example, the user begins writing a rule and the system and method of the present disclosure read, analyze and automatically select items from the rule and begin to color code them or otherwise code them (shown in curly brackets below). Example 1 below shows identifying parts of an informal rule according to one aspect of the present disclosure. If an item in the rule is not automatically selected, for instance, because that word did not map to the ontology, the user may manually select the word and add it to the ontology and map it to an existing data or data structure. In another aspect, the user may create new data or data structure (metadata) to map the new word. Again, any known or will be known user interface tool or technique may be used to allow the user to select and color or otherwise code the items in the rule.

EXAMPLE 1

If the customer has a {cigar} in {their cart} and {they're} a {full-time employee}, make sure {they're no older than 20} and then offer {them} the {cognac promotion}.

At step 310 of FIG. 3, portions of the informal rule are grouped for formalizing or formalization. The user groups parts of the rule into portions that are logical to them. No formal logic structures are imposed and system resources do not need to be formally available. Example 2 below shows grouping of portions (in parenthesis) of an informal rule according to one aspect of the present disclosure. The user may then organize grouped parts of the rule into a formal rule and/or parts of a formal rule.

EXAMPLE 2

If (the customer has a cigar in their cart) and (they're a full-time employee), make sure (they're no older than 20) and then offer (them the cognac promotion).

Example 3 below shows text that is identified and grouped according to one aspect of the present disclosure.

EXAMPLE 3

(the customer has a cigar in their cart)
(they're a full-time employee)
(they're no older than 20)

In this example, the user can draw a link from "customer" to "their" and "they're", i.e., the three references the user used in this example that refer to the same meta data concept, in order to formalize the fact that these three natural language words refer to the same ontological meta data. For example, to draw a link, the user may use known or will be known methodology to select multiple texts to be linked together. The ontology support of the present disclosure that maps the words in the rule to underlying data or data structure could use this linked information to further formalize the rule. For instance, the user may manually link plurality of concepts in the rule when the ontology support tool does not automatically mark up the words. The words would not be marked automatically in instances where the ontology tool was not able to recognize the words as part of the domain. This provides a clue to the user that the rule is not yet understood by the system and thus the user needs to decide how to handle unmarked portions of their rule in progress. The ontology support tool uses the link information to further formalize the rule. If the rule vocabulary matches that of the system data, i.e., if the informal rule matches the ontology exactly, then it is by definition formalized. In the absence of an exact match, the rule needs further development to be fully formalized. To this end, the system and method of the present disclosure serves as a way for the user to annotate the relevant parts (e.g., resources, constants, comparison, logic) of the rule that need to be mapped to existing concepts in the ontology or added to the existing ontology.

The ontology support tool of the present disclosure enables collaboration between the author of the business rule and a computer programmer. The rule author can formalize the rule to a point where it can be executed by a computer using the specific domain ontology. If the rule remains unexecutable in part or in whole, then the rule specified thus far serves as documentation and intent of the rule author for the programmer to finish the rule specification and/or augment the domain ontology accordingly.

The system and method of the present disclosure allow a business user who is not a computer programmer to specify a rule in familiar language such as natural language (e.g., English) and to formalize that rule to the point where it can be executed by a computer. If the user did not formalize the rule completely, then enough information should still have been entered so a person skilled in computer programming can complete the formalization of the rule. The process of formalizing the rule can help the non-programmer to be more precise about meaning and intent so as to removed ambiguity in the formal rule specification.

Example 4 shows annotation of parts of a rule according to one aspect of the present disclosure. The user may link the relationship between the customer and the cart creating the property of customer.cart. The user may conclude that there are relationships between customer and cart as well as between cart and cigar.

EXAMPLE 4

[the customer has a cigar in customer cart]
[customer a full-time employee]
[customer older than 20]

Figure 4:
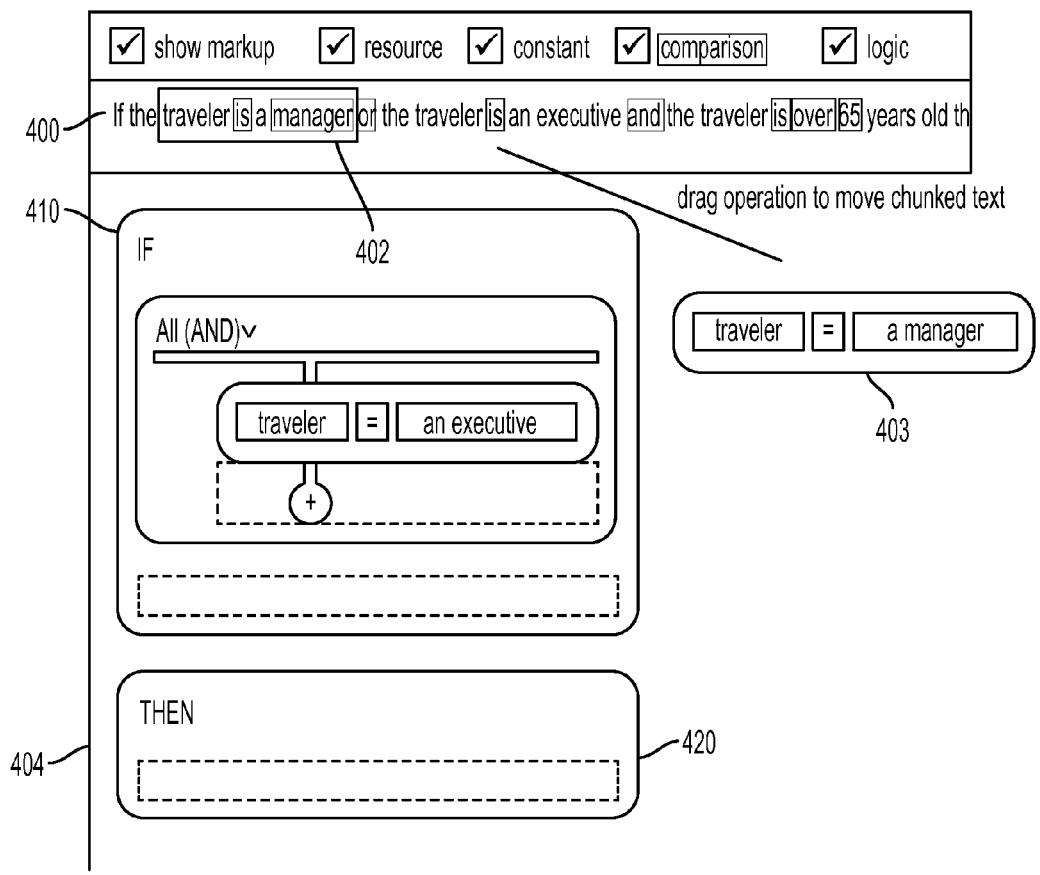
FIG. 4 illustrates a rule pad and rule editor according to one embodiment of the present disclosure.

FIG. 4 illustrates a screenshot of a user interface program including a rule pad 400 and rule editor 404 according to one aspect of the present disclosure for allowing rule building and formalization. Via the tool bar shown at 400, the user may request that the ontology system to automatically identify and mark up the text into different parts, i.e., resource, constant, comparison, logic, for example, by checking the "show markup" box. The checked boxes for each of the parts would indicate to the ontology system, what parts should be identified or marked. A rule may be entered or presented from existing rules, and displayed on the rule pad 406. The rest of the screen shown may be used as a rule editor 404. The user may select marked up text 402 from the rule pad 406 and drag the text into the rule editor 404. The user may select and drag the marked-up text 402 into the rule editor 404. The rule editor 404 attempts to build a formal simple sentence out of the selected text as shown at 403 using the resource, constant, and comparison identified in the selected text. This methodology supports a bottom up working style. That is, the author can build a complex rule in a piecewise fashion from smaller formalized parts. The selected text may be then automatically dragged by the system and method of the present disclosure into the appropriate part of the rule where the user can visualize them, e.g., IF part of the rule 410 or the THEN part of the rule 420, based on the automatic ontology analysis. In addition or alternatively, the user may manually drag the selected portion into the IF 410 or THEN 404 parts of the rule editor. The group of text remains marked up as the user drags it to the IF/THEN 410, 420 structure of the rule. In one embodiment, both manual and automatic draggings are supported. Any portion of the rule, including the entire rule, may be dragged and marked up. Based on the underlying ontology, the system and method of the present disclosure make the best guess at what the user intends and displays the result graphically in an easily understood and unambiguous form, i.e., in reference to the current ontology. The user then may further edit the formalized rule entered into 410 and 420 as needed or desired.

Figure 5:
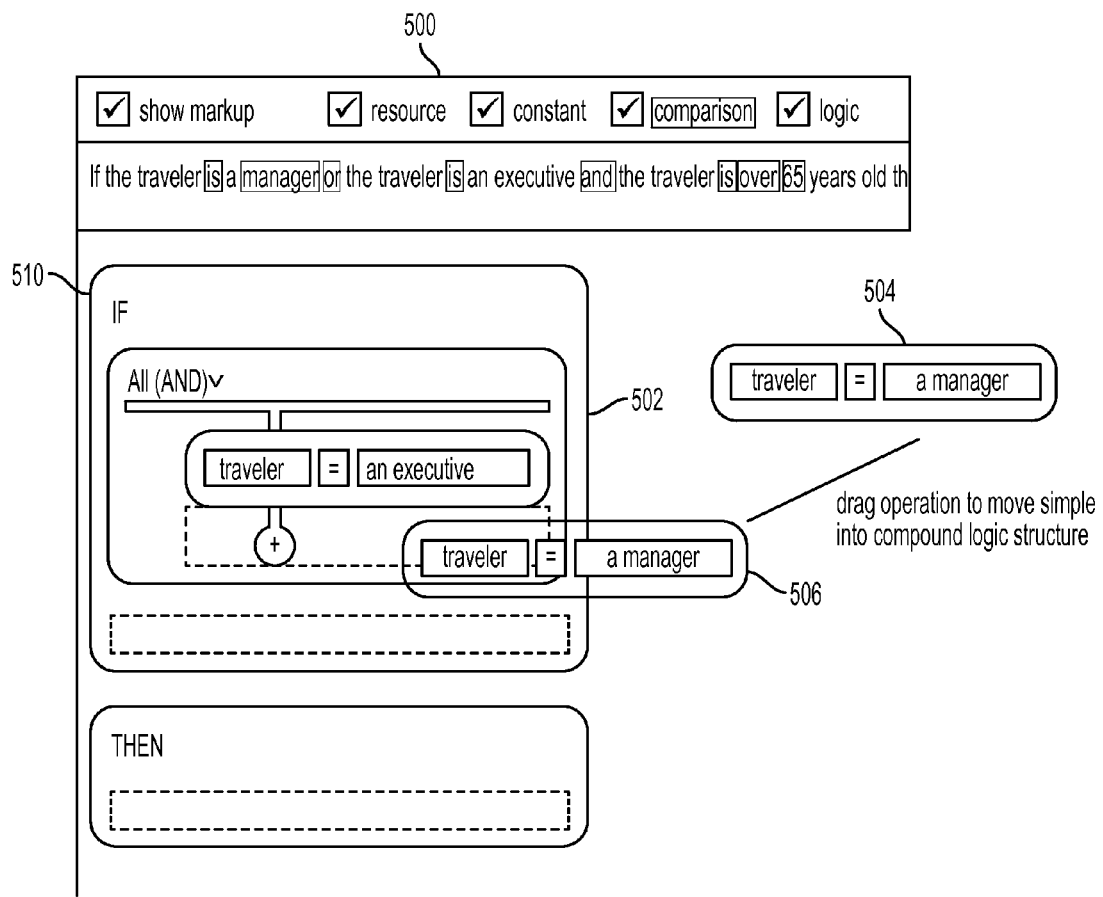
FIG. 5 illustrates a rule pad and rule editor according to one embodiment of the present disclosure.

FIG. 5 illustrates another view of rule pad and rule editor according one embodiment of the present disclosure. The drag operation can move the portion of text from the rule pad 500 into the compound logic structure 502 of rule editor 510.

Also, as explained with reference to FIG. 4, a fragment or portion of the rule may be selected and dragged into simple sentence container 504 to construct a formal rule out of the dragged text. The user may then drag the formal rule into the logic structure as shown at 506. Thus, the user may manually mark up areas of the text based rule by dragging over words or groups of words. Custom colors may be assigned and defined within the system. In this case, the user does not need to know the precise way in which the marked up items map to actual system resources. If the rule author cannot determine if elements of their natural language (rule) expression indeed exist within the current ontology, the rule author may define colors and annotations to communicate with other developers of the rule, e.g., with programmers, who may introduce new meta data into the ontology or recognize existing meta data as appropriate for the newly color coded items.

Figure 6:
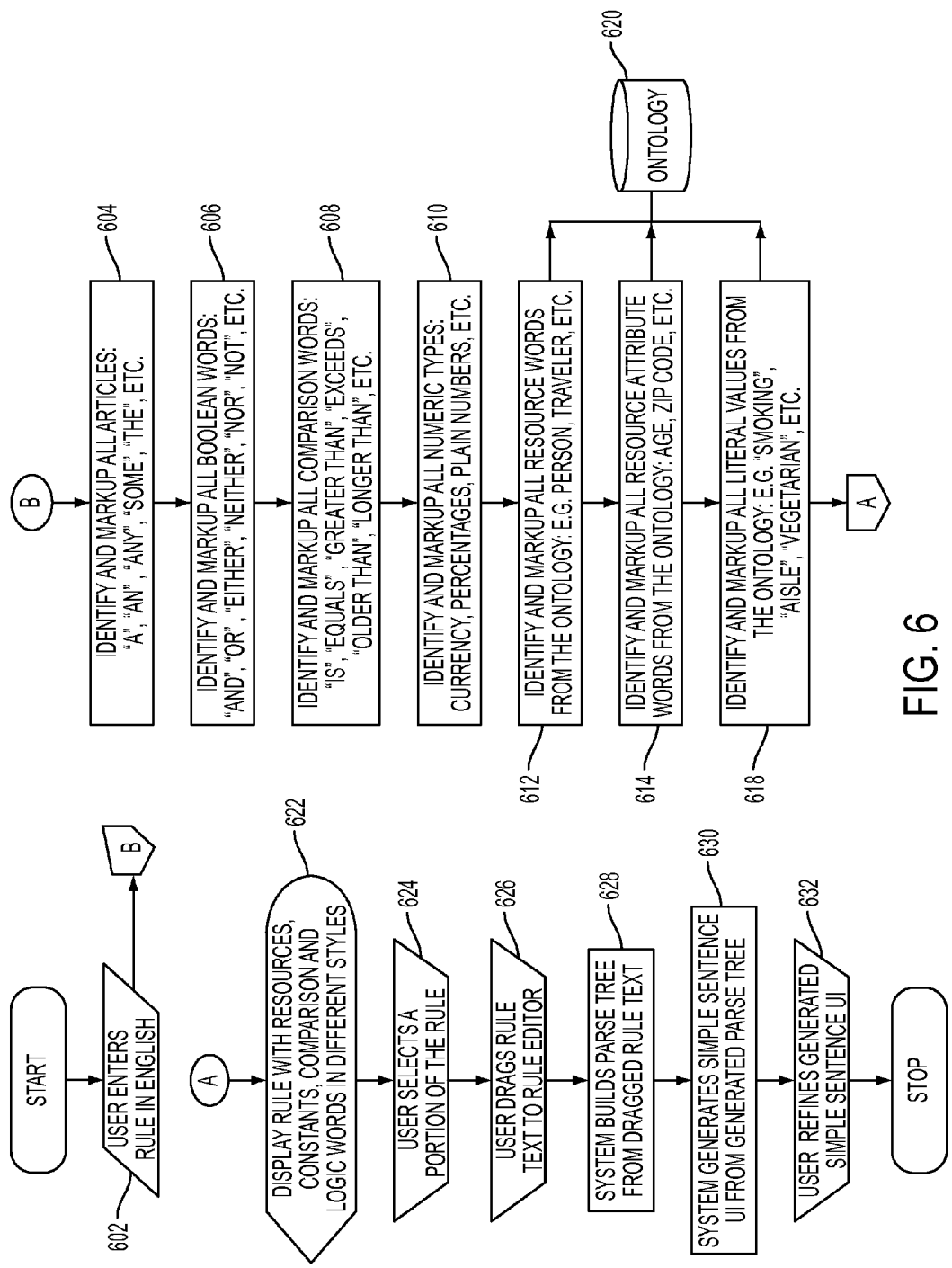
FIG. 6 illustrates a smart mark-up methodology of the present disclosure in one embodiment.

FIG. 6 illustrates a smart mark-up methodology of the present disclosure in one embodiment. At 602, the user enters the text of the rule in English or another natural language or like, and the system marks up the rule by identifying logic words, comparison words and words that exist in the ontology, for example, according to the flow shown at 604-620.

Figure 7A:
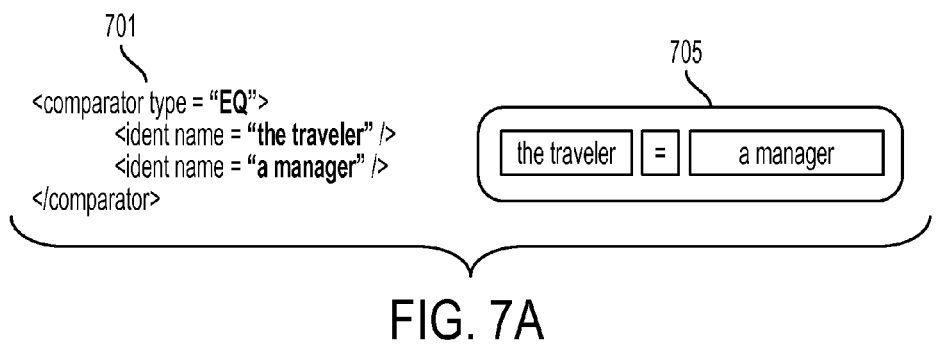
FIG. 7a illustrates an example simple sentence with its parse tree.

At 624, the user selects all or a portion of the rule, and drags it to the rule editor (e.g., 404 FIG. 4). At 628, the system creates a parse tree (FIG. 7a 701) of the portion of the rule that was dragged and at 630, creates a simple sentence (FIG. 7a 705) rule part. At 632, the user may refine the generated simple sentence rule part.

The simple sentence (FIG. 7a 705) has not yet been formalized. It may still contain articles ("the" and "a") and refer to a resource ("traveler") and a constant string ("manager").

The user may now right-click on the resource ("traveler") (FIG. 8a 801) to see information about which resource the system has matched and which attributes that resource has.

The user may select a resource/attribute combination (FIG. 8a 805) that is appropriate for the meaning of the rule part.

Figure 8A:
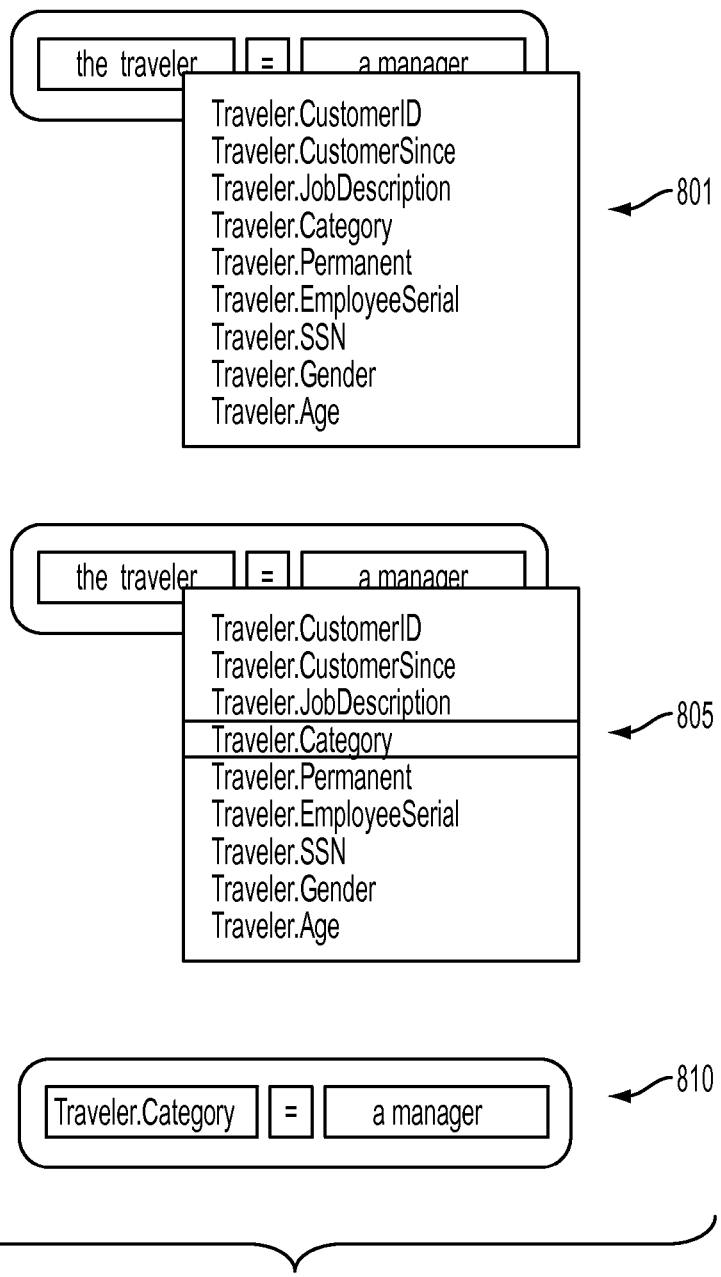
FIG. 8a and FIG. 8b illustrate examples of resources.

The simple sentence will display the selected resource and attribute (FIG. 8a 810).

The user may also right click on the right part of the expression ("manager") (FIG. 8b 815) to see a list of acceptable strings based on the selected "Traveler.Category" resource.

Figure 8B:
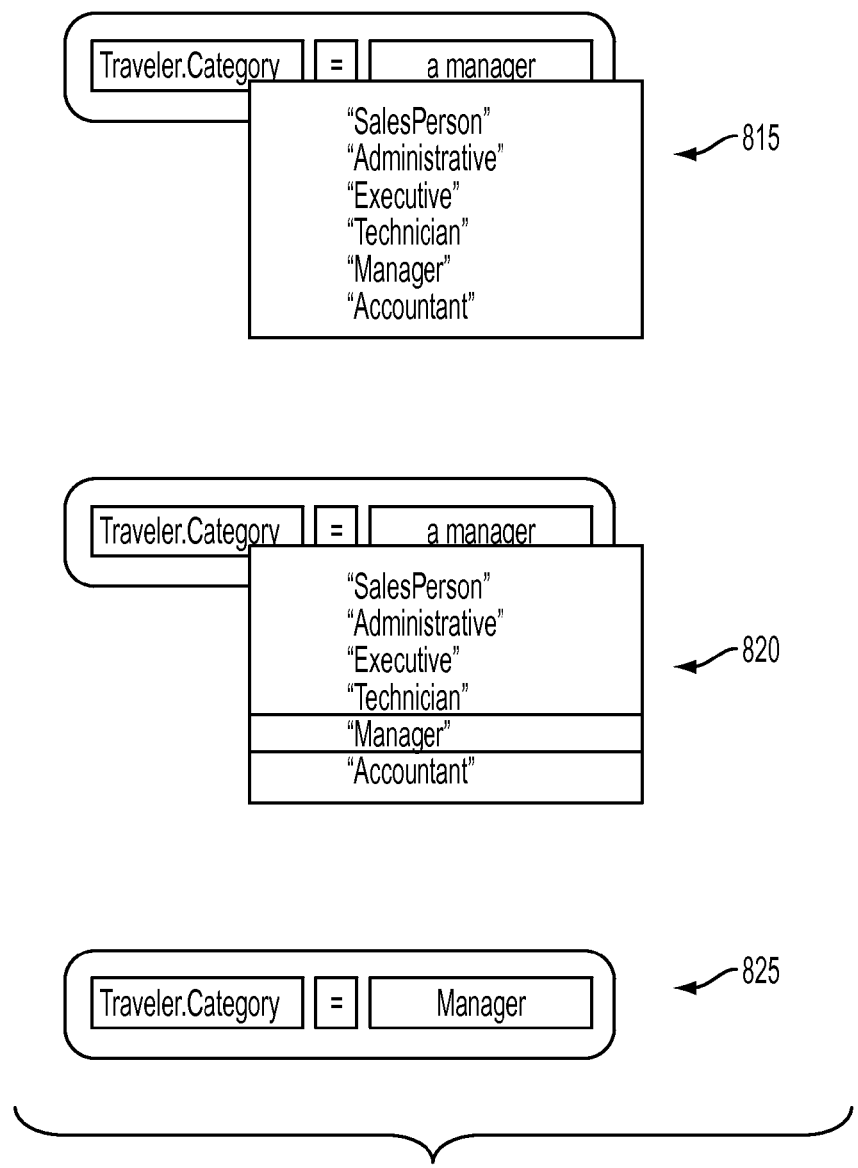

The user may select the appropriate string (FIG. 8b 820).

The simple sentence will automatically adjust to show the user's selection (FIG. 8b 825).

At this point, this simple sentence portion of the rule is completely specified. It specifies the resource and attribute of that resource "Traveler.Category", the comparison "=" (equals) and the constant value to which the comparison is being made "Manager".

Figure 9:
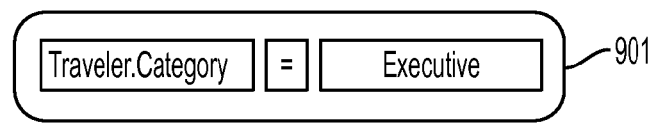
FIG. 9 illustrates an example of a fully specified simple sentence.

The user may do this for other parts of the rule such as "the traveler is an executive" to produce a similar fully specified simple sentence (FIG. 9 901).

Figure 10:
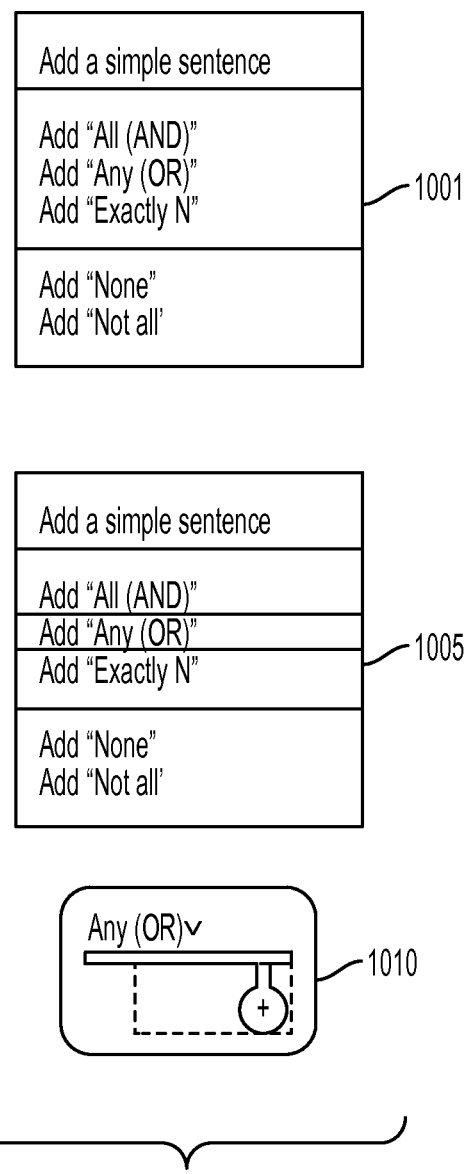
FIG. 10 illustrates an example of building a simple logic expression.

These simple sentences can be combined with Boolean operators to form compound expressions by right-clicking in the rule editor space and adding a Boolean operator (FIG. 10 1001).

For example, selecting the "OR" operator (FIG. 10 1005) produces an empty "OR" operator (FIG. 10 1010).

Figure 11:
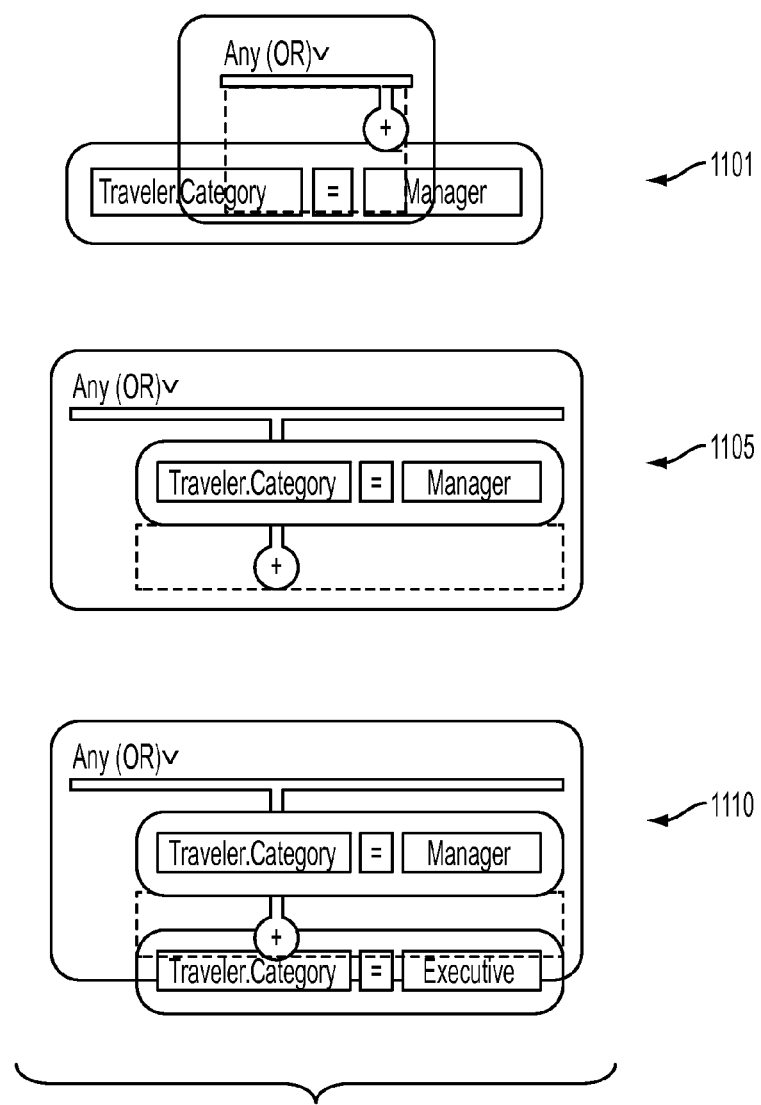
FIG. 11 illustrates an example of adding to an existing logic expression.

The simple sentences (FIG. 8b 825) may be dragged onto the Boolean operator (FIG. 11 1101) and the system automatically adds them to the Boolean expression (FIG. 11 1105).

Figure 12A:
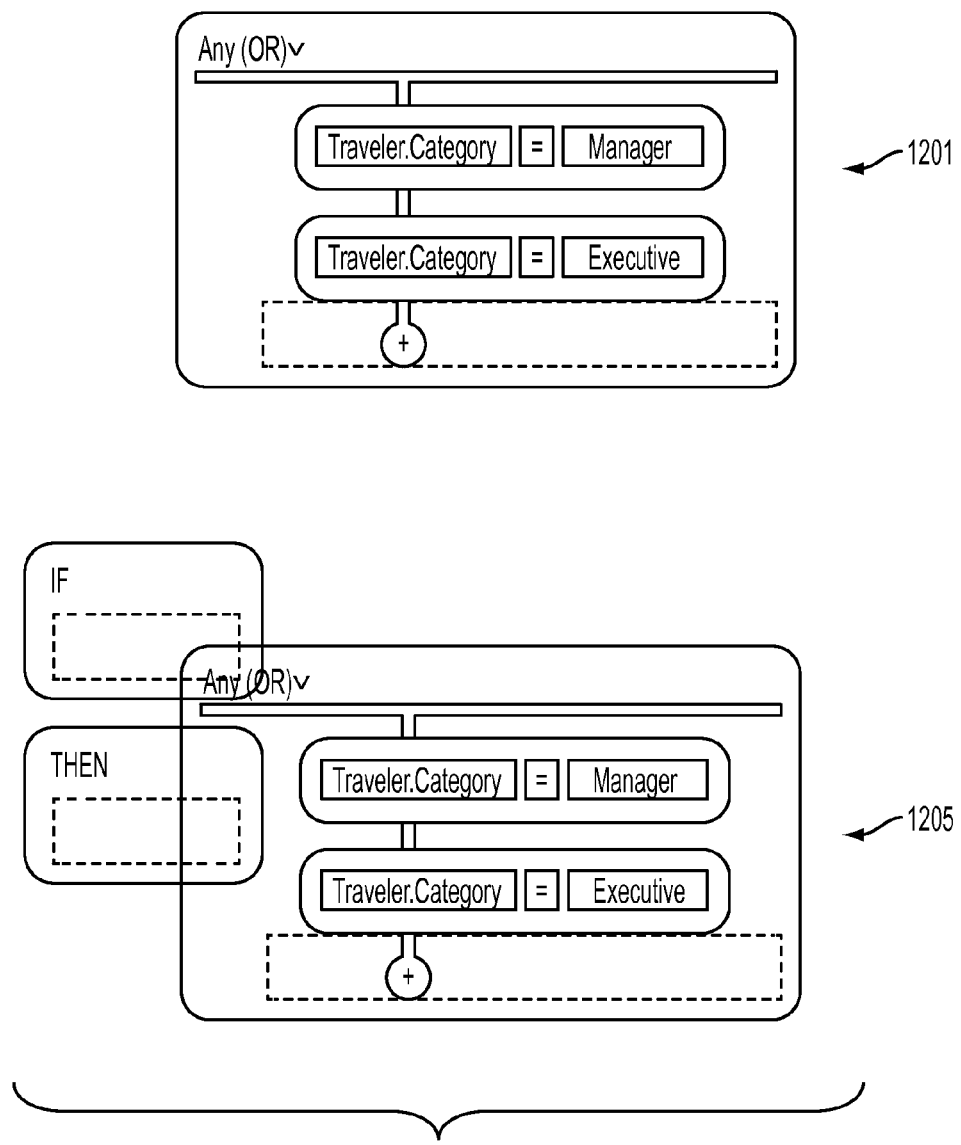
FIG. 12a and FIG. 12b illustrate an example of a formally specified complex logic expression.

The user may drag another simple sentence to the Boolean operator to add it to the expression and the system automatically adjusts the expression accordingly (FIG. 12a 1201).

Figure 12B:
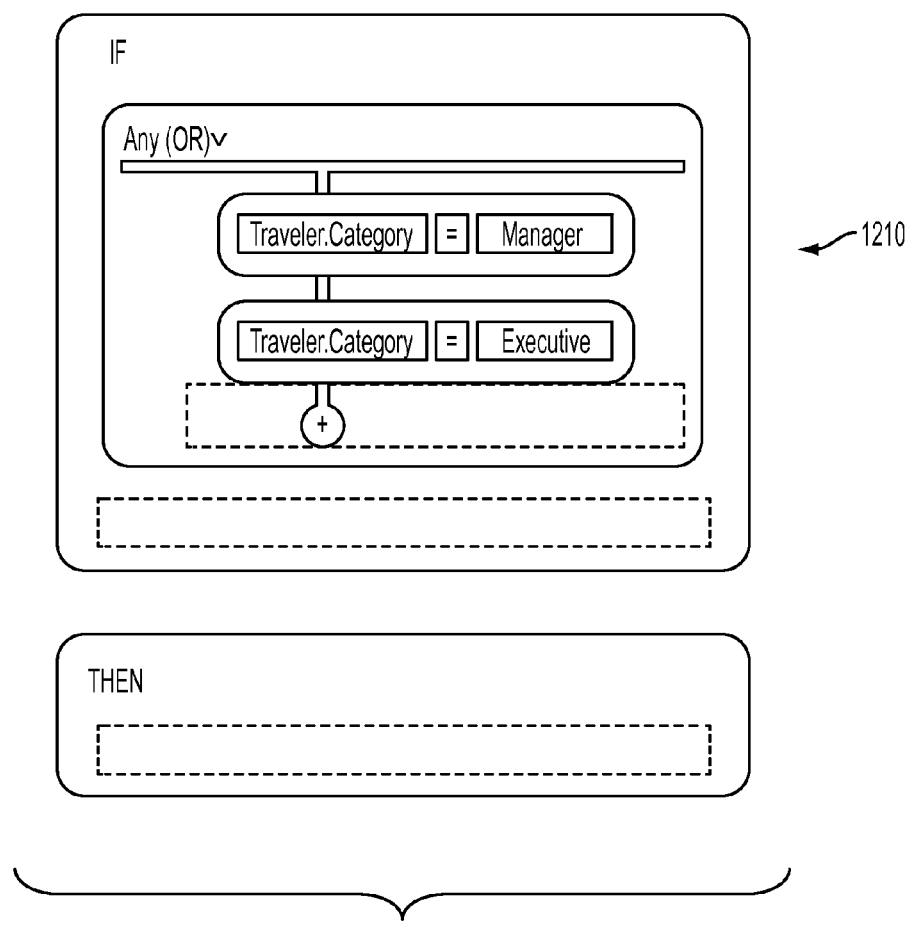

The entire Boolean expression may then be dragged onto the IF/THEN expression (FIG. 12a 1205) where it is added to the expression (FIG. 12b 1210).

Figure 7B:
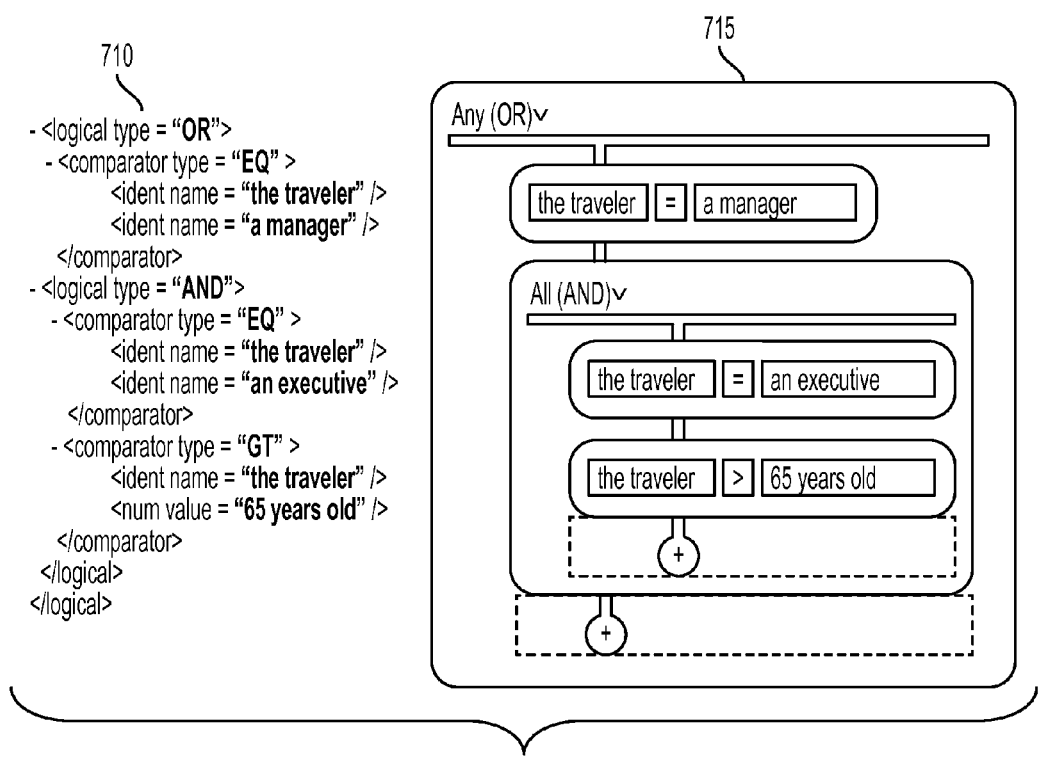
FIG. 7b illustrates an example complete expression with its parse tree.

Larger portions of the original rule expression may be dragged onto the rule editor and the system attempts to build a complete expression (FIG. 7b 715) from the generated parse tree (FIG. 7b 710).

The user may then visit each simple sentence in the generated compound expression as above and formalize each simple sentence.

Referring to the method at 604, the system and method of the present disclosure automatically identify and markup all articles such as "a", "an", "any" "some", "the", and others. At 606, Boolean words are also identified and marked. Examples of Boolean words include but are not limited to, "and", "or" "either", "neither", "nor", "not", etc. At 608, comparison words are identified and marked. Examples of comparison words include but are not limited to, "is", "equal", "greater than", "exceeds", "older than", "longer than", "less than", etc. At 610, words that may be of numeric types are identified and marked, for example, currency, percentage, plain numbers, etc. At 612, using ontology 620, resource words in the domain being considered are identified and marked. Resource words may include, but are not limited to, person, traveler, etc. At 614, resource attribute words such as age, zip code, etc., are identified using the ontology 620, and marked. At 618, words representing literal values such as "smoking", "aisle", "vegetarian", etc. are identified using the ontology 620 and marked. Unrecognized words in the rule expression may be stored as comments. Further, the user may be provided with an option to add the unrecognized words and relating them to the concepts or meta data existing in the ontology 620.

Briefly, ontology herein refers to a formal representation of a set of concepts within a domain and the relationships between those concepts. The system and method of the present disclosure may store such database of ontology in a storage as shown at 620.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 13:
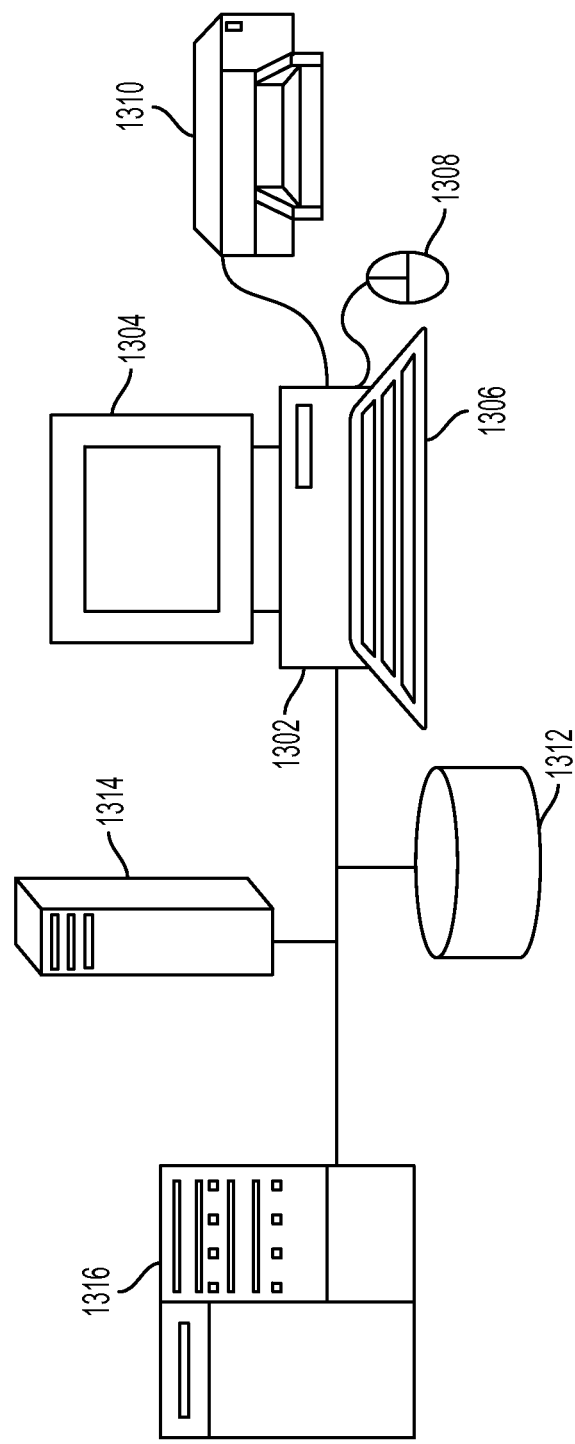
FIG. 13 illustrates an example of a computer system, in which the systems and methodologies of the present disclosure may be carried out or executed.

Referring now to FIG. 13, the systems and methodologies of the present disclosure may be carried out or executed in a computer system that includes a processing unit 1302, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 1302 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 1304 for presenting output displays and providing a display through which the user may input data and interact with the processing system, for instance, in cooperation with input devices such as the keyboard 1306 and mouse device 1308 or pointing device. The computer processing system may be also connected or coupled to one or more peripheral devices such as the printer 1310, scanner (not shown), speaker, and any other devices, directly or via remote connections. The computer processing system may be connected or coupled to one or more other processing systems such as a server 1310, other remote computer processing system 1314, network storage devices 1312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 1302, 1314, 1316), or on any single platform, for instance, accessing data stored locally or distributedly on the network.

The terminology used herein is for the purpose of describing particular embodiments only and is not intended to be limiting of the invention. As used herein, the singular forms "a", an and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. For example, while the above description may have been described with reference to, and using examples of, business rules and operations, the system and method of the present invention may be applied to different domains and areas other than business. Thus, various changes and modifications may be effected by one skilled in the art without departing from the spirit or scope of the invention as defined in the appended claims.

We claim:

1. A computer-implemented method for transforming a natural language expression into a formal logical expression, comprising:
   identifying using a database of ontology, by a processor, words in a natural language expression as resources, constants and comparisons, the resources being associated with meta data that specify when to use the words of the resources;
   using the identified words representing resources, constants and comparisons to build a formal logical expression by the processor; and
   presenting the formal logical expression on a user interface device, by the processor, the user interface device presenting at least a rule pad portion into which the natural language expression is input and a rule editor portion comprising graphically visualized IF part and THEN part, wherein the presenting further comprises automatically dragging the formal logical expression into one of the IF part and the THEN part.

2. The method of claim 1, further including building a parse tree of the natural language expression and wherein the step of identifying is performed using the parse tree.

3. The method of claim 2, further including adding words unrecognizable by the ontology into the database of ontology.

4. The method of claim 2, further including storing unrecognized words in the parse tree as comments.

5. The method of claim 1, wherein the natural language expression is a part of a rule expressed in natural language and a plurality of natural language expressions are built into a plurality of formal logical expressions to form an aggregated formal logical expression.

6. The method of claim 1, refining the built formal logical expression based on user input.

7. The method of claim 1, wherein the natural language expression is selected as a portion of a rule entered via a user interface rule pad.

8. The method of claim 1, wherein the natural language expression comprises a business rule.

9. The method of claim 8, wherein the natural language expression is manually entered.

10. The method of claim 8, wherein the natural language expression is an existing policy.

11. A system for transforming a natural language expression into a formal logical expression, comprising:
    a processor;
    a user interface module operable to execute on the processor and further operable to present at least a rule pad section and a rule editor section, the rule pad section for entering a rule in natural language expression, and the rule editor section for presenting formalized rules;
    a database of ontology storing word concepts and relations; and
    a processing module operable to identify words of a natural expression in the rule as resources, constants and comparisons using the ontology, the resources being associated with meta data that specify when to use the words of the resources, and build a formal logical expression, said formal logical expression being presented via the rule editor section, the user interface device presenting at least a rule pad portion into which the natural language expression is input and a rule editor portion comprising graphically visualized IF part and THEN part, wherein the processing module is operable to further automatically place the formal logical expression into one of the IF part and the THEN part.

12. The system of claim 11, wherein the processing module is further operable to build a parse tree of the natural language expression, the processing module identifying the words using the parse tree.

13. The system of claim 12, wherein the processing module is further operable to add words unrecognizable by the ontology into the database of ontology.

14. The system of claim 12, wherein the processing module is further operable to store unrecognized words in the parse tree as comments.

15. The system of claim 11, wherein the natural language expression is a part of a rule expressed in natural language and a plurality of natural language expressions are built into a plurality of formal logical expressions to form an aggregated formal logical expression.

16. The system of claim 11, wherein the built formal logical expression is refined based on user input.

17. The system of claim 11, wherein the natural language expression is selected as a portion of a rule entered via the rule pad section of the user interface module.

18. The system of claim 11, wherein the natural language expression comprises a business rule.

19. The system of claim 18, wherein the natural language expression is manually entered.

20. The system of claim 18, wherein the natural language expression is an existing policy.

21. A program storage device readable by a machine, tangibly embodying a program of instructions executable by the machine to perform a method of transforming a natural language expression into a formal logical expression, comprising:

identifying using a database of ontology, words in a natural language expression as resources, constants and comparisons, the resources being associated with meta data that specify when to use the words of the resources;

using the identified words representing resources, constants and comparisons to build a formal logical expression, and presenting the formal logical expression on a user interface device, the user interface device presenting at least a rule pad portion into which the natural language expression is input and a rule editor portion comprising graphically visualized IF part and THEN part, wherein the presenting further comprises automatically dragging the formal logical expression into one of the IF part and the THEN part.

22. The program storage device of claim 21, further including building a parse tree of the natural language expression and wherein the step of identifying is performed using the parse tree.

23. The program storage device of claim 22, further including adding words unrecognizable by the ontology into the database of ontology.

24. The program storage device of claim 22, further including storing unrecognized words in the parse tree as comments.

25. The program storage device of claim 21, wherein the natural language expression is a part of a rule expressed in natural language and a plurality of natural language expressions are built into a plurality of formal logical expressions to form an aggregated formal logical expression.

\* \* \* \* \*